US006766164B1

United States Patent
Funk et al.

(10) Patent No.: US 6,766,164 B1
(45) Date of Patent: Jul. 20, 2004

(54) SYSTEM AND METHOD FOR PROVIDING RADIO FREQUENCY CONDITIONS FOR TESTING WIRELESS COMMUNICATIONS EQUIPMENT

(75) Inventors: Robert B. Funk, Garfield, NJ (US); Martin H. Meyers, Montclair, NJ (US); Hongyi Wang, Livingston, NJ (US); Ron Lessnick, Bedminster, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/233,175

(22) Filed: Jan. 19, 1999

(51) Int. Cl.[7] .............................. H04Q 7/32; H04Q 7/20; H04Q 7/34

(52) U.S. Cl. ..................... 455/423; 455/424; 455/425; 455/67.11; 455/67.13; 455/422.1; 379/24; 379/21; 379/26.02; 379/27.01

(58) Field of Search ................................. 455/423, 424, 455/425, 67.11, 403, 422, 500, 502, 69, 67.12, 67.13, 517, 245.1; 370/342, 328, 330, 343; 342/170; 379/24, 26.02, 21, 27.01

(56) References Cited

U.S. PATENT DOCUMENTS

| 5,341,146 | A | * | 8/1994 | Vennum et al. ............. 342/170 |
| 5,425,076 | A | * | 6/1995 | Knippelmier ............... 455/423 |
| 5,465,393 | A | * | 11/1995 | Frostrom et al. .......... 455/67.1 |
| 5,481,588 | A | * | 1/1996 | Rickli et al. ............... 455/67.1 |
| 5,596,570 | A | * | 1/1997 | Soliman .................... 455/67.1 |
| 6,052,584 | A | * | 4/2000 | Harvey et al. ............. 455/423 |
| 6,073,026 | A | * | 6/2000 | Kim et al. .................. 455/424 |
| 6,081,564 | A | * | 6/2000 | Han ........................ 455/245.1 |
| 6,104,919 | A | * | 8/2000 | Lyall, Jr. et al. ........... 455/67.1 |

* cited by examiner

Primary Examiner—William Trost
Assistant Examiner—Keith Ferguson

(57) ABSTRACT

An apparatus and a method for recreating radio frequency (RF) conditions of a cellular network extracts significant RF effects from field test data, and recreates variable RF attenuation using a multi-channel attenuator. A field data processor converts the field test data to time-varying attenuator control values for each channel of the multi-channel attenuator. Accordingly, a mobile in the lab which is connected to the multi-channel attenuator sees the same carrier and interference levels that were observed in the field environment, allowing cellular communication equipment testing without repeated field testing.

36 Claims, 11 Drawing Sheets

SYSTEM AND METHOD FOR PROVIDING RADIO FREQUENCY CONDITIONS FOR TESTING WIRELESS COMMUNICATIONS EQUIPMENT

BACKGROUND OF THE INVENTION

1. Field of the Invention

The present invention relates to an apparatus and a method for recreating radio frequency (RF) field conditions using previously collected data, thus allowing wireless communications equipment testing and optimization without repeated field testing.

2. Description of Prior Art

The complexity of a typical cellular communication network, particularly a code division multiple access (CDMA) network, makes it difficult to accurately analyze, test, and optimize network parameters and equipment using computer simulation. Thus, field testing is typically performed using a mobile diagnostic device connected to a mobile phone ("mobile") to gather field test data as the mobile moves throughout the network region.

One known mobile diagnostic device collects CDMA field data representing carrier and interference levels seen by a mobile, and stores the collected field data as a field test data file.

A mobile in a CDMA network repeatedly searches for and detects pilot signals transmitted from network cell sectors. The relative strengths of the pilot signals allow the mobile to determine which cell sector should handle call traffic, and allow controlled handoffs between cell sectors as the mobile moves through the CDMA network area. The mobile diagnostic device collects "searcher" data for each pilot detected by the diagnostic mobile at frequent intervals. Specifically, the mobile diagnostic device collects an Ec/Io value, representing the ratio of energy measured at the mobile's demodulator to overall interference, for each detected pilot. The mobile diagnostic device further measures total pilot signal power, $P_t^{pilot}$, received at the mobile at time t.

To optimize system parameters of a deployed cellular network, and test new algorithms (e.g., handoff algorithms), numerous RF performance tests are typically necessary. In other words, each time a system parameter is changed, a new test must be performed by using the mobile diagnostic to collect a new field test data file. Such repeated field testing is time-consuming. Furthermore, the RF conditions in the cellular network are constantly changing, and thus the reliability of repeated tests under changing field conditions is low.

SUMMARY OF THE INVENTION

The present invention relates to an apparatus and a method for recreating RF conditions of a cellular network from previously generated field test data. Cell sectors in a lab setting are connected to a computer-controlled, multi-channel attenuator device which, based on variable control values extracted from the field test data, creates a variable RF loss along a plurality of forward (cell sector to mobile) and reverse (mobile to cell sector) attenuation paths. Such variable control values represent the RF loss which occurred between the network cell sectors and the mobile diagnostic device.

Using a limited number of cell sectors and the multi-channel attenuator, the present invention recreates the network environment represented by the field test data so that a mobile phone connected to the multi-channel attenuator sees essentially the same carrier and interference levels that were observed by the mobile diagnostic device in the field. Thus, the present invention allows RF effects to be observed which were previously seen only in complex deployed cellular networks. Furthermore, since the test conditions remain exactly the same, network parameters can be tested independently of uncontrollable and dynamic parameters that are inevitable when repeated field tests are performed.

DETAILED DESCRIPTION

The following detailed description relates to an apparatus and a method for recreating RF conditions of a cellular network using previously gathered field test data.

RF Environment Recreating Apparatus-Overview

Figure 1:
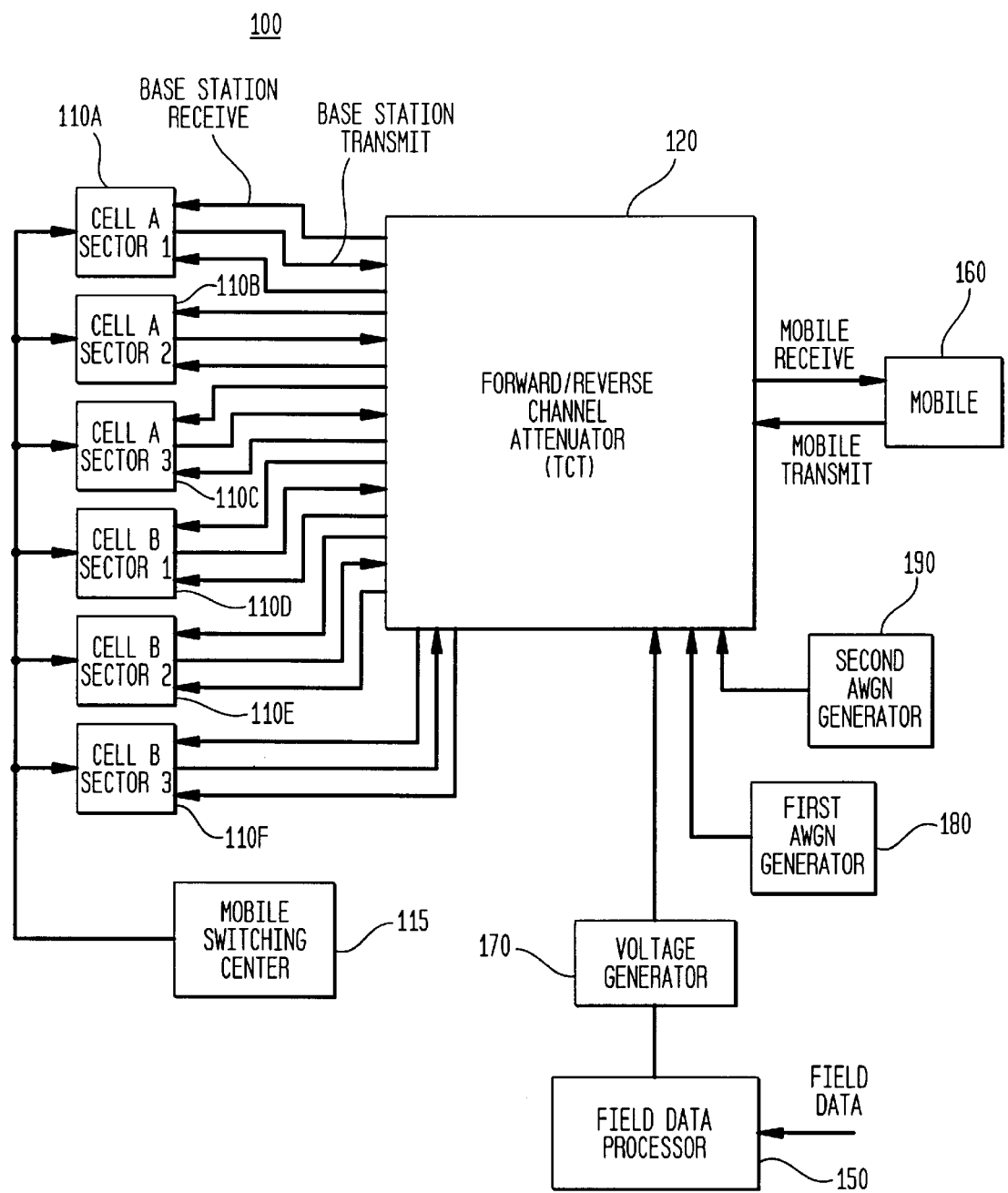
FIG. 1 is a block diagram of the apparatus for recreating radio frequency field conditions in accordance with the embodiment of the present invention.

FIG. 1 illustrates the overall configuration of an RF environment recreating apparatus 100 according to the present invention. The RF environment recreating apparatus 100 includes six main components: a group of six cell sectors 110A–110F connected to a mobile switching center 115; a forward/reverse channel attenuator 120; a field data processor 150; a mobile 160; a voltage generator 170; a first average white gaussian noise (AWGN) generator 180; and a second AWGN generator 190.

As illustrated in FIG. 1, the field data processor 150 receives field test data which was previously gathered by a mobile diagnostic device in a cellular network region. In a manner discussed below, the field data processor 150 processes the received field test data to extract significant pilots, assign the extracted pilots to forward channels of the forward/reverse channel attenuator 120, and calculate variable attenuator control values for each channel of the forward/reverse channel attenuator 120 at frequent time intervals so that the forward/reverse channel attenuator 120 recreates the RF loss which occurred in the cellular network between the network cell sectors and the mobile diagnostic device.

The field data processor 150 is connected to the voltage generator 170. The voltage generator 170 receives the attenuator control values from the field data processor 150 and generates attenuator control voltages which are output to the forward/reverse channel attenuator 120.

As shown in FIG. 1, the disclosed embodiment utilizes two cells, A and B, each having three sectors. The six cell sectors 110A–110F respectively output a base station transmit signal including pilot, paging ("page"), and synchronizing ("sync") signals at preset power levels. When the RF recreating apparatus 100 is used to test, for example, voice signal quality received at the mobile 160, the base station transmit signals output by the cell sectors 110–110F further include call traffic received from the mobile switching center 115.

The forward/reverse channel attenuator 120 is connected to each cell sector 110–110F to receive a base station transmit signal from each of the cell sectors 110–110F. As discussed in detail below, the forward/reverse channel attenuator 120 includes a separate forward (cell sector to mobile) attenuation channel for each base station transmit signal received from the cell sectors 110–110F. These forward attenuation channels variably attenuate the respective received base station transmit signals in accordance with attenuator control voltages received from the voltage generator 170. The forward/reverse channel attenuator 120 combines the variably attenuated base station transmit signals output by each forward channel, and is connected to the mobile 160 to output the result as a mobile receive signal.

The forward/reverse channel attenuator 120 is further connected to the mobile 160 to receive a mobile transmit signal generated by the mobile 160. To simulate diversity reception, each cell sector 110–110F is connected to the forward/reverse channel attenuator 120 to receive a pair of base station receive signals. Therefore, because there are six cell sectors 110–110F in the preferred embodiment, the forward/reverse channel attenuator 120 splits the mobile transit signal received from the mobile 160 along twelve separate reverse (mobile to cell sector) attenuation channels. The forward/reverse channel attenuator 120 is further connected to the first AWGN generator 180 to receive a noise signal which is used to represent residual power and noise from the collected field test data. For example, the first AWGN generator 180 creates a noise signal to represent the signal power which was detected by the mobile diagnostic device, but not recreated by the cell sectors 110–110F. The forward/reverse channel attenuator 120 includes a forward interference channel and a reverse interference channel for receiving and variably attenuating the noise signal (e.g., −4 dBm) output by the first AWGN generator 180. The forward/reverse attenuator 120 is further connected to the voltage generator 170 to receive attenuator control voltages for each forward, reverse, and interference attenuation channel so that the RF loss along each channel reflects network conditions.

The forward/reverse channel attenuator 120 is further connected to the second AWGN generator 190. The forward/reverse channel attenuator 120 receives a noise signal generated by the second AWGN generator 190, and adds noise to each forward and reverse attenuation channel. For example, if the user wishes to recreate field conditions having a much higher level of noise than the environment represented by the field test data, the second AWGN generator 190 outputs a relatively high-power noise signal to the forward/reverse channel attenuator 120, which introduces the noise received from the second AWGN generator 190 to the forward and reverse channels. Thus, the second AWGN generator 190 allows a user to vary the network conditions created by the forward/reverse channel attenuator 120.

The operation of the RF environment recreating apparatus 100 shown in FIG. 1 will next be described. Initially, the field data processor 150 receives and stores a field test data file. The field data processor 150 extracts significant pilots (e.g., pilots with highest signal strength), which correspond to the significant network cell sectors, from the field test data at frequent time intervals (e.g., every 2 seconds). The field data processor 150 assigns the extracted significant pilots to forward channels of the forward/reverse channel attenuator 120. Furthermore, in accordance with the pilots which are assigned to the forward channels of the forward/reverse channel attenuator, the field data processor 150 calculates variable attenuator control values for each forward and reverse channel of the forward/reverse channel attenuator 120. The voltage generator 170 converts these variable attenuator control values to attenuator control voltages.

The forward/reverse channel attenuator 120 receives the attenuation control voltages from the voltage generator 170. In accordance with the control voltages received from the voltage generator 170, the forward/reverse channel attenuator 120 recreates the attenuation levels from the cellular network. In other words, each forward interference channel, and corresponding reverse interference channels, recreate the attenuation which existed between the network cell sector outputting the assigned pilot and the mobile diagnostic device.

By assigning the significant pilots to the forward channels of the forward/reverse channel attenuator 120, the RF environment recreating apparatus 100 recreates most of the pilot, page, and sync power in the field using the six forward channels of the forward/reverse channel attenuator 120. The RF recreating apparatus 100 treats all the residual pilot, page, and sync power, as well as other interference power represented in the field test data, as noise. To recreate noise which represents the residual power and noise form the field test data, the first AWGN generator 180 creates a noise signal which is fixed (e.g., −4 dBm), or varied based on the field test data. The forward and reverse interference channels of the forward/reverse channel attenuator 120 receive the noise signal from the first AWGN generator 180 and variably attenuate the noise signal in accordance with attenuator control values calculated by the field data processor 150 so that the forward/reverse channel attenuator 120 recreates an accurate residual power and noise component at each time instant.

In accordance with the attenuator control voltages received from the voltage generator 170, each forward channel of the forward/reverse channel attenuator 120 creates a variable RF loss for each signal received from the cell sectors 110–110F to recreate the network conditions in the lab setting. Since the attenuator control values are extracted from actual field test data, the mobile 160 in the lab sees the same carrier and interference levels that were observed by the mobile in the field environment. Using the reverse channels of the forward/reverse channel attenuator 120, the field interference environment is also recreated for mobile transmit signals.

These features of the RF environment recreating apparatus 100 will be discussed specifically below.

Forward/Reverse Channel Attenuator (TCT)

Figure 2:
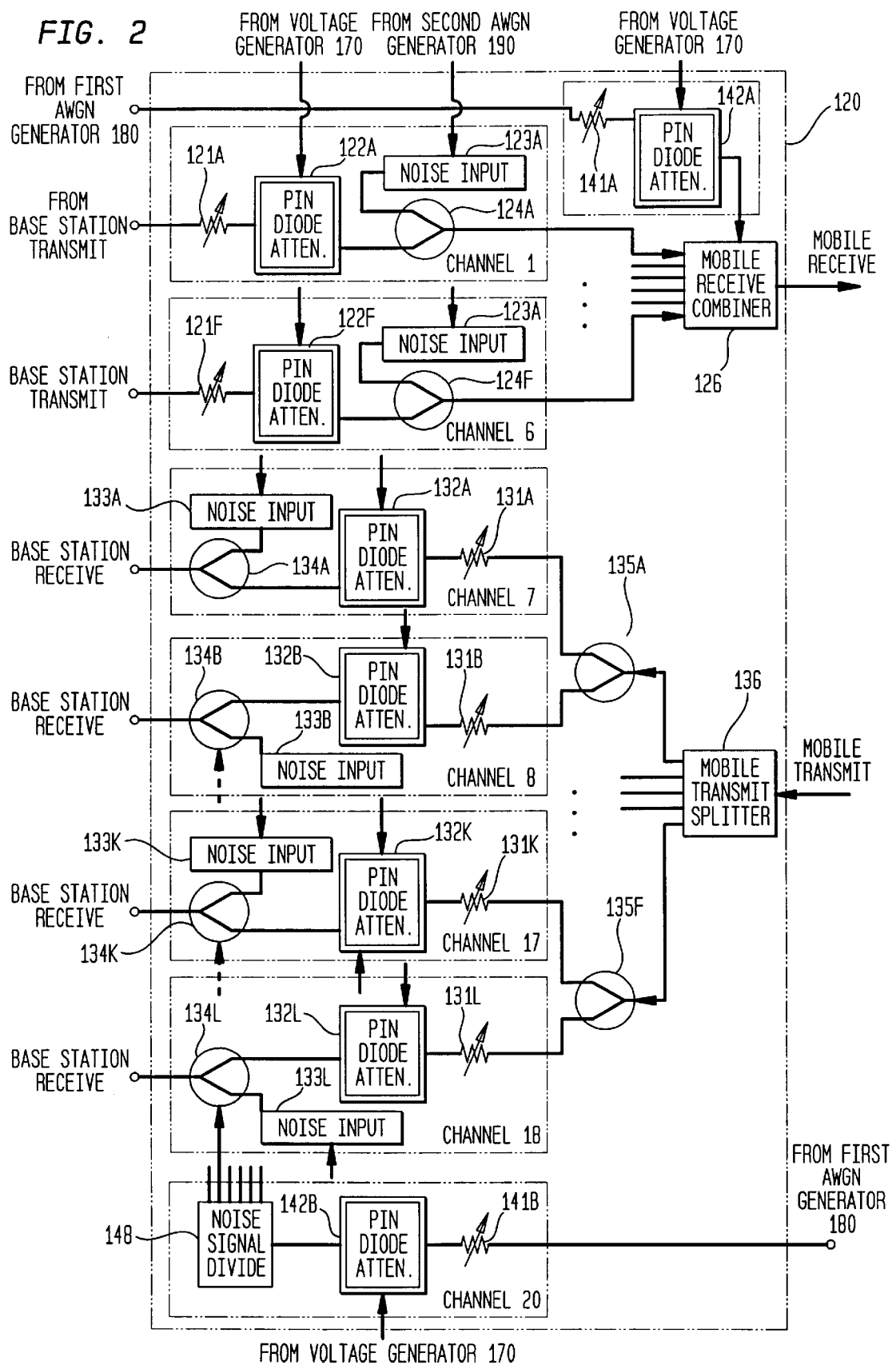
FIG. 2 is a block diagram of the forward/reverse channel attenuator for the apparatus of FIG. 1.

Referring to FIG. 2, the forward/reverse channel attenuator 120 includes: (1) six forward attenuation channels ("channels 1–6") for variably attenuating base station transmit signals received from the cell sectors 110A–110F respectively; (2) twelve reverse attenuation channels ("channels 7–18") for variably attenuating the mobile transmit signal received from the mobile 160 (since each cell sector 110A–110F receives two base station receive signals to simulate diversity reception, the forward/reverse channel attenuator has twelve reverse channels); (3) a forward interference attenuation channel ("channel 19"); and (4) a revere interference attenuation channel ("channel 20"). Since the forward/reverse channel attenuator 120 includes twenty channels in the disclosed embodiment, it is referred to herein as the twenty channel tester ("TCT") 120. It should be recognized that a different number of channels may be utilized, depending for example on the number of cell sectors in the lab. Furthermore, the configuration of the TCT tester 120 may be modified to correspond to the specific cellular network represented by the field test data.

For ease of illustration, FIG. 2 shows only two of the six forward channels (channels 1 and 6), four of the twelve reverse channels (channels 7, 8, 17, and 18), and the forward and reverse interference channels 19 and 20. Channels 2–5 have the same configuration as channels 1 and 6, and channels 9–16 have the same configuration of channels 7, 8, 17, and 18.

As illustrated in FIG. 2, each forward channel 1–6 includes four components: a manual attenuator 121A . . . 121F; a PIN diode attenuator 122A . . . 122F; a noise input 123A . . . 123F; and a combiner 124A . . . 124F.

Using channel 1 as an example, a base station transmit signal from cell sector 110A is received at the manual attenuator 121A, which is set during an initial system set-up operation (discussed below). The PIN diode attenuator 122A is connected to the manual attenuator 121A to receive the attenuated base station transmit signal from the manual attenuator 121A. The PIN diode attenuator 122A also receives a time-varying control voltage from the voltage generator 170 to control the amount of attenuation caused by the PIN diode attenuator 122A. More specifically, the PIN diode attenuator 122A has a dynamic attenuation range, e.g., a range of 0 to –64 dB, which is linearly related to the input voltage from the voltage generator 170, e.g., in the range of 0.0 to 10.0 Volts. In this specific example, 0 dB attenuation results from a 0.0 Volt input, and –64 dB attenuation results from a 10.0 Volt input.

As discussed above, the TCT 120 introduces a variable amount of noise, generated by the second AWGN generator 190, into each of the forward channels 1–6. Referring again to channel 1 as a specific example, a noise input unit 123A receives a noise signal from the second AWGN generator 190. The noise input unit 123A outputs the noise signal to the combiner 124A, which receives and combines the noise signal from the noise input 123A and the output of the PIN diode attenuator 122A.

The forward channels 1–6 respectively output the results of the combiners 124A . . . 124F, which are received and combined by a mobile receive signal combiner 126 into a single base station transmit signal. The mobile receive signal combiner 126 outputs the mobile receive signal, which the forward/reverse channel attenuator 120 outputs to the mobile 160.

As shown in FIG. 2, each reverse channel 7–18 also includes four components: a manual attenuator 131A . . . 131L; a PIN diode attenuator 132A . . . 132L; a noise input 133A . . . 133L; and a combiner 134A . . . 134L.

Initially, a mobile transmit signal splitter 136 receives the mobile transmit signal from the mobile 160, and splits the mobile transmit signal along six separate paths. Furthermore, a series of six splitters 135A–135F respectively receive a mobile transmit signal from the mobile transmit signal splitter 136, to further split the received mobile transmit signal. Thus, the reverse channels 7–18 each receive a mobile transmit signal.

Using the reverse channel 7 as a specific example, the manual attenuator 131A receives a mobile transmit signal from the splitter 135A. The PIN diode attenuator 132A is connected to the output of the manual attenuator 131A. Like the PIN diode attenuators 121A . . . 121F of forward channels 1–6, the PIN diode attenuator 132A of channel 7 receives a time-varying control voltage from the voltage generator 170 so that the PIN diode attenuator 132A of channel 7 variably attenuates the output of the manual attenuator 131A.

Like forward channel 1 described above, reverse channel 7 includes a noise input 133A, which receives a noise signal from the second AWGN generator 190. The combiner 134A of channel 7 adds the noise signal from the noise input 133A to the variably attenuated output of the PIN diode attenuator 132A. The TCT attenuator 120 outputs the result of the combiner 134A as a base station receive signal to the cell sector 110A. Cell sector 110A also receives a base station receive signal from channel 8. Similarly, the cell sector 110B receives base station receive signals from channels 9 and 10; the cell sector 110C receives base station receive signals from channels 11 and 12; the cell sector 110D receives base station receive signals from channels 13 and 14; the cell sector 110E receives base station receive signals from channels 15 and 16; and the cell sector 110F receives base station receive signals from channels 17 and 18.

As shown in FIG. 2, forward interference channel 19 includes two components: a manual attenuator 141A; and a PIN diode attenuator 142A. Channel 19 receives a noise signal, representing residual power and interference, from the first AWGN generator 180.

The channel 19 manual attenuator 141A receives and attenuates the noise signal from the first AWGN generator 180. The channel 19 PIN diode attenuator 142A receives the output of the channel 19 manual attenuator 141A. Like the PIN diode attenuators of channels 1–18, the channel 19 PIN diode attenuator 142A receives a time-varying control voltage from the voltage generator 170, and variably attenuates the noise signal received from the channel 19 manual attenuator 141A.

The mobile receive signal combiner 126 receives the output of the forward interference channel 19, and combines the attenuated noise signal from the forward interference channel 19 with the outputs of forward channels 1–6. Thus, the mobile receive signal output by the TCT 120 includes a variably attenuated noise component from the forward interference channel 19 to reflect residual power and interference.

As shown in FIG. 2, the reverse interference channel 20 includes three components: a manual attenuator 141B; a PIN diode attenuator 142B; and a noise signal divider 148. Like the forward interference channel 19, the reverse interference channel 20 receives a noise signal from the first AWGN generator 180.

The channel 20 manual attenuator 141B receives and attenuates the noise signal from the first AWGN generator 180. The channel 20 PIN diode attenuator 142B receives the output from the channel 20 manual attenuator 141B and, like the PIN diode attenuators of channels 1–19, receives a time-varying control voltage from the voltage generator 170. The noise signal divider 148 receives the variably attenuated noise signal from the channel 20 PIN diode attenuator 142B, and divides the attenuated noise signal equally into twelve noise signals. The combiners 134A . . . 134L of reverse channels 7–18 each receive a noise signal component from the reverse interference signal divider 148. Thus, the base station receive signals output by the TCT 120 to the cell sectors 110A–110F each include a noise component from the reverse interference channel 20.

Field Data Processor

Figure 3:
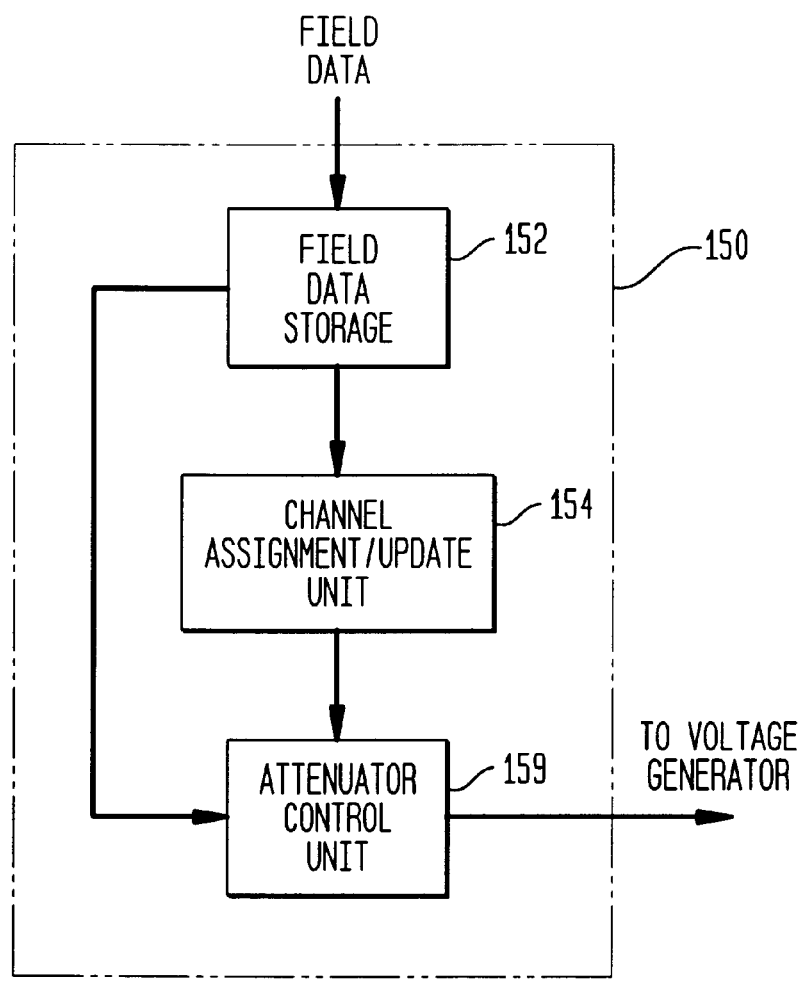
FIG. 3 is a block diagram of the field data processor for the apparatus of FIG. 1.

Referring to FIG. 3, the field data processor 150 includes three main components: a field data storage unit 152; a channel assignment/update unit 154; and an attenuator control unit 159. The field data storage unit 152 receives and stores the previously gathered field test data. The channel assignment/update unit 154 is connected to the field data storage unit 152 to retrieve the field test data stored therein. As will be discussed in detail below, the channel assignment/ update unit 154 processes the field test data to extract the significant pilots and assign the extracted pilots to the forward channels of the TCT 120 at frequent time intervals. The attenuator control unit 159 is connected to the channel assignment/update unit 154 to receive the results of channel assignment/updating, and is further connected to the field data storage unit 152 to retrieve the field test data stored therein. The attenuator control unit 159 processes the field test data file retrieved from the field data storage unit 152 in accordance with the results of channel assignment/updating to calculate the time-varying attenuation control values for each channel of the TCT 120.

These functions of the field data processor 150 will next be described. As mentioned above, the diagnostic mobile gathers data for each detected pilot at frequent time intervals (e.g., every 200 ms). There are six cell sectors in the embodiment illustrated in FIG. 1, although a greater or lesser number of cell sectors may be used. Therefore, the channel assignment/update unit 159 must frequently determine the significant pilots, corresponding to the significant network cell sectors, and assign these pilots to the forward channels of the TCT 120. In other words, since the field test data may include values for more than six pilots at a given time instant, the significant pilots (e.g., the strongest pilots) are determined and assigned to the forward channels of the TCT 120 so that the forward channels of the TCT 120 recreate the variable RF loss between the network cell sectors outputting the assigned pilots and the mobile diagnostic device.

Figure 4:
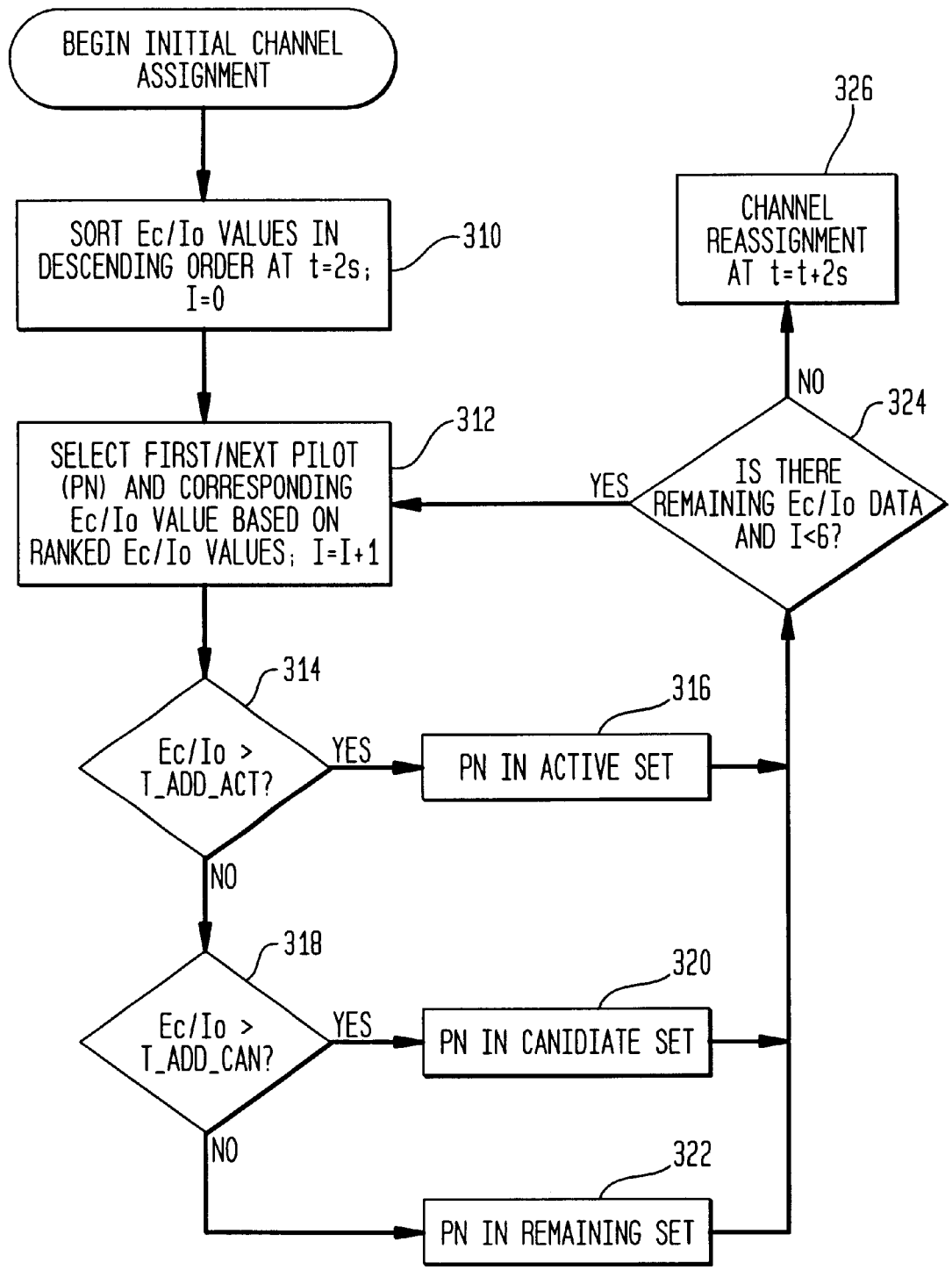
FIG. 4 is a flowchart illustrating the initial channel assignment algorithm performed by the field data processor according to the present invention.

To determine the significant pilots, the channel assignment/updating unit 154 performs an initial channel assignment operation and a channel updating operation, which are described with reference to the flowcharts of FIGS. 4 and 5A–5F. While these operations utilize Ec/Io values to assign/update pilots, it should be recognized that other values, such as Ec, may be suitable for extracting significant pilots from the field test data. The initial channel assigning process is illustrated in FIG. 4.

At step 310, the Ec/Io values for all detected pilots at time t=2 seconds are sorted in descending order. At step 312, the first ranked pilot, corresponding to the highest ranked Ec/Io value, is selected. At step 314, the Ec/Io value for the selected pilot is compared to a threshold value T_ADD_ ACT (e.g., −14 dB). The corresponding pilot is designated as an "active" pilot at step 316 if Ec/Io is greater than T_ADD_ACT. The channel selection algorithm then proceeds to step 324 to determine whether all six forward channels have been initially assigned.

If the comparison of step 314 indicates that Ec/Io is not greater than T_ADD_ACT, the channel assignment algorithm proceeds to step 318. At step 318, Ec/Io is compared to a second threshold, T_ADD_CAN (e.g., −15 dB). When Ec/Io is greater than T_ADD_CAN, the corresponding pilot is designated as a "candidate" pilot at step 320, and the initial channel assignment algorithm proceeds to step 324 to determine whether all six forward channels have been initially assigned.

When step 318 indicates that Ec/Io is not greater than T_ADD_CAN, the selected pilot is designated as a "remaining" pilot, and the algorithm proceeds to step 324 to determine whether all six forward channels have been initially assigned.

After the pilot selected at step 312 has been designated as "active," "candidate," or "remaining," the initial channel assigning algorithm determines at step 324 that initial channel assignment is complete when all six channels have been assigned, or there are no more ranked Ec/Io values. In other words, when the field test data includes less than six pilot signals at time t, at least one of the forward channels of the TCT 120 will be idle (i.e., the PIN diode attenuator of that channel is set to create the highest possible attenuation level). The algorithm then proceeds to step 326 to initiate channel updating at time t=t+2 seconds.

As the mobile diagnostic device moves throughout the cellular network area, the set of significant pilots changes. Furthermore, the strongest six pilots at a given time instant may not be the most significant pilots. For example, some pilots may be weak at time t, but very strong two seconds before time t and two seconds after time t. Such pilots should be maintained in the same channel for a certain time period after their Ec/Io value drops below a threshold levels to preserve most of the handoff activities of the cellular network. In accordance with the present invention, the channel assignment/update unit 154 reassigns each forward channel at predetermined time intervals, e.g. every 2 seconds. This channel updating process will next be described with reference to FIGS. 5A–5F.

When reassigning channels, previously idle channels are assigned to new detected pilots with relatively strong Ec/Io values. Furthermore, previously assigned pilots which are particularly significant, designated as either "active" or "candidate" pilots, are maintained for a certain amount of time, even after their corresponding Ec/Io value drops below a certain threshold. This ensures that the forward channel assignments for significant pilots, which may be only temporarily obscured, are maintained for at least a predetermined time period. Forward channels which have previously been assigned pilots which are not particularly significant, designated as "remaining" pilots, and which now have Ec/Io values below newly detected pilots, are reassigned to such new pilots.

Figure 5A:
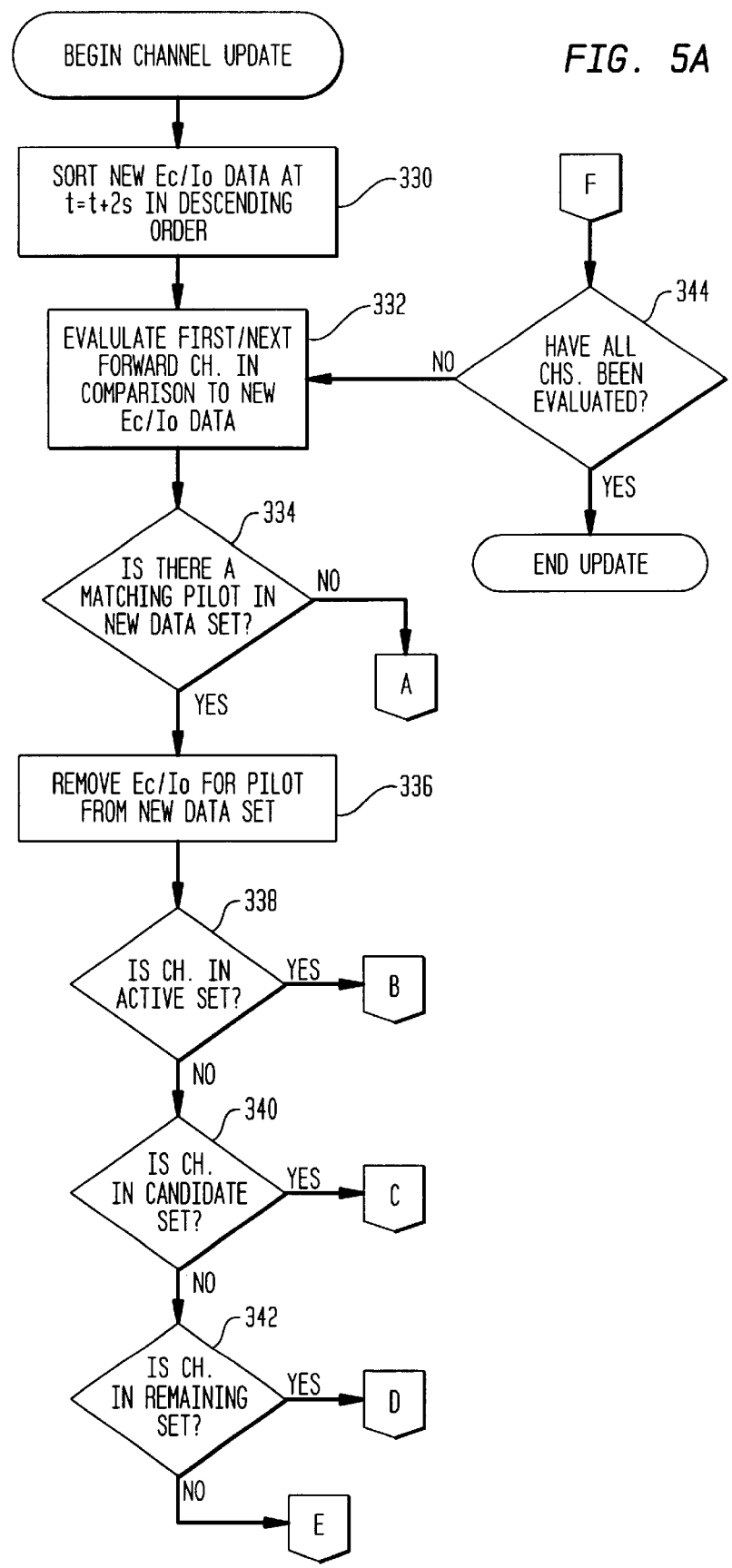
FIGS. 5A–5F are flowcharts illustrating the channel updating algorithm performed by the field data processor according to the present invention.
Figure 5B:
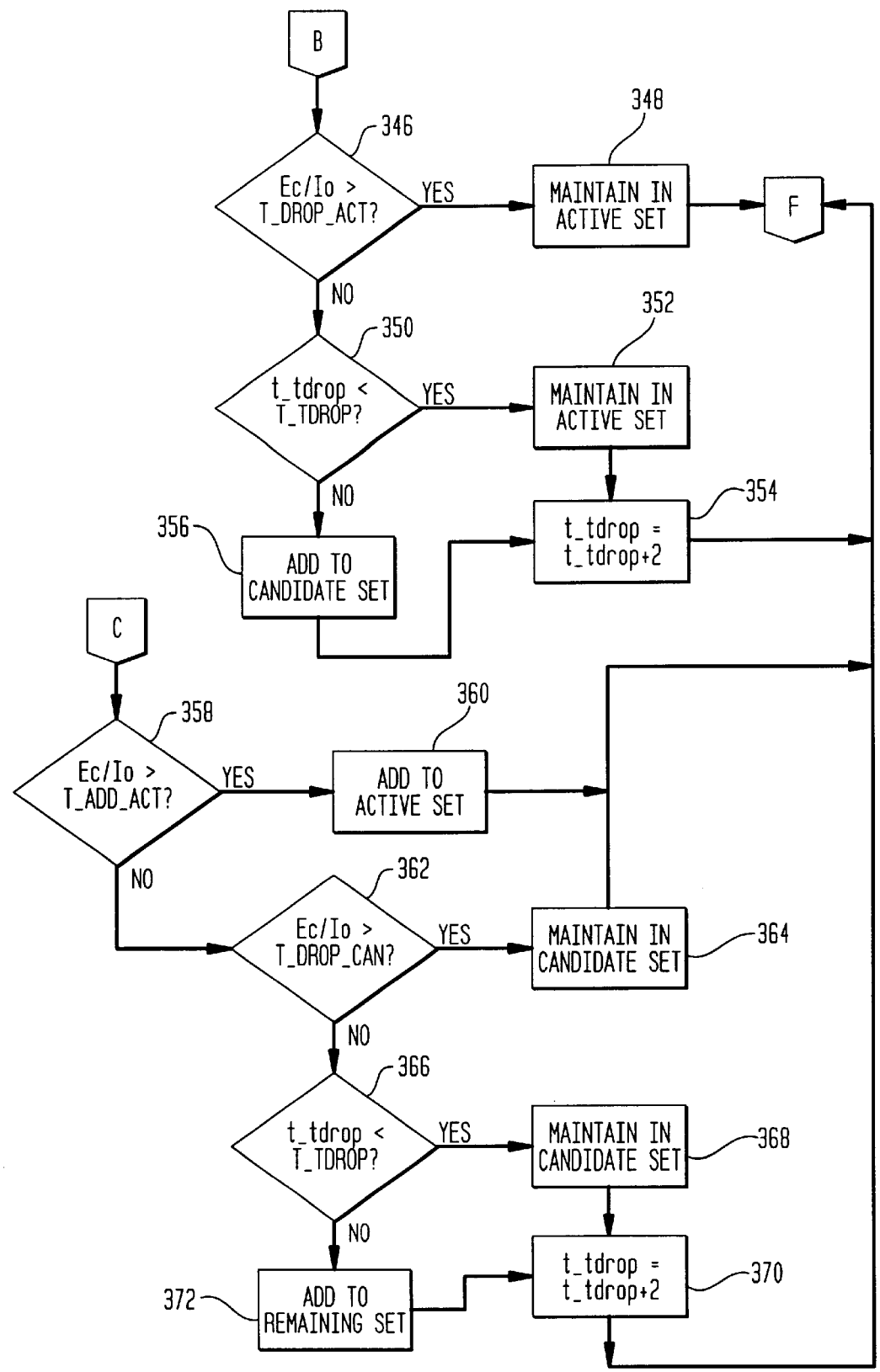
Figure 5C:
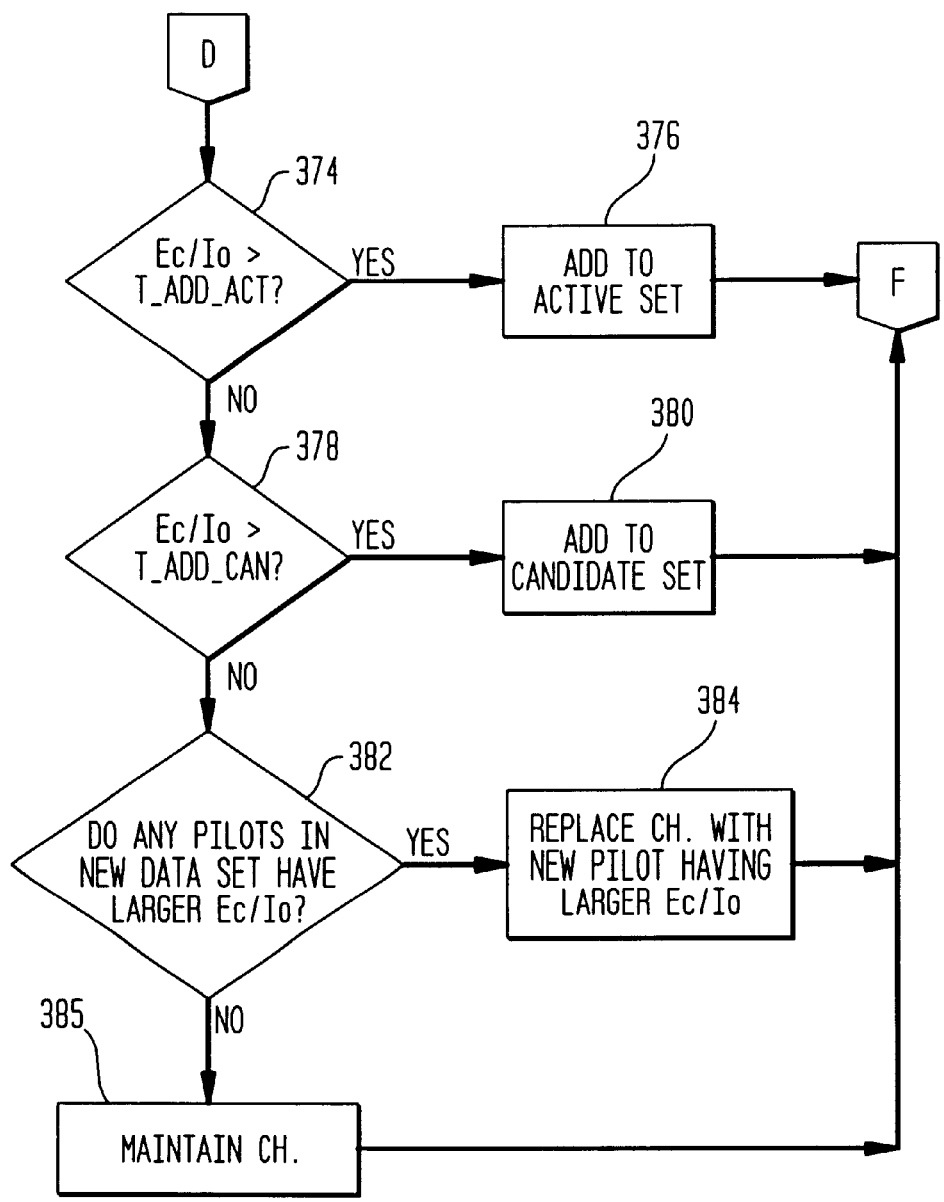

At step 330, the Ec/Io values at time t=t+2 seconds are ranked in descending order. At step 332, the pilot which is assigned to the first forward channel (i.e., channel 1 of the TCT 120) is evaluated so that, at step 334, the updating algorithm determines whether an Ec/Io value data for the assigned pilot is included in the new set of Ec/Io values. If so, the Ec/Io value for the assigned pilot is removed from the new set of Ec/Io values at step 336. Next, at step 338, the channel updating algorithm determines whether the assigned pilot is "active." If yes, the new Ec/Io value for the assigned pilot is compared to a threshold, T_DROP_ACT (e.g., −16 dB), at step 346 (FIG. 5B). If the new Ec/Io value for the assigned "active" pilot is greater than T_DROP_ACT, the pilot is maintained as "active" at step 348, and the updating algorithm proceeds to step 344 to evaluate the next channel. When step 344 indicates that all six forward channels have been evaluated and updated, the updating algorithm ends for time t=t+2 seconds. If less than all forward channels have been evaluated and updated, the channel updating algorithm returns to step 332.

Referring again to FIG. 5B, when the comparison of step 346 indicates that the new Ec/Io value for the assigned "active" pilot is not greater than T_DROP_ACT, a time value, t_tdrop, associated with the assigned pilot is compared to a threshold value T_TDROP (e.g., 2–3 seconds) at step 350. If t_tdrop is less than T_TDROP, the pilot is maintained as an "active" pilot at step 352, and t_tdrop is incremented by 2 seconds at step 354 before the algorithm proceeds to step 344. When the comparison of step 350 indicates that t_tdrop is not less than T_TDROP, the pilot is designated as a "candidate" pilot, instead of an "active" pilot, t-tdrop is incremented by 2 seconds at step 354, and the channel updating algorithm proceeds to step 344.

Referring again to FIG. 5A, when step 338 indicates that the assigned pilot for the channel being evaluated is not "active," the channel updating algorithm determines at step 340 whether the pilot is a "candidate" pilot. If yes, the channel updating algorithm determines at step 358 (FIG. 5B) whether the new Ec/Io value for the assigned pilot exceeds T_ADD_ACT. If so, the pilot is designated as an "active" pilot at step 360, and the algorithm proceeds to step 344. When step 358 indicates that Ec/Io does not exceed T_ADD_ACT, the Ec/Io value is compared to a threshold, T_DROP_CAN, at step 362 (e.g., −17 dB). If Ec/Io is greater than T_DROP_CAN, the assigned pilot is maintained as a "candidate" pilot at step 364, and the channel updating algorithm returns to step 344. When step 362 indicates that the new Ec/Io value does not exceed T_DROP_CAN, the t_tdrop value for the assigned pilot is compared to T_TDROP at step 366. If t_tdrop is less than T_TDROP, the pilot is maintained as a "candidate" at step 368, t_tdrop is incremented by 2 seconds at step 370, and the channel updating algorithm proceeds to step 344. When step 366 indicates that t_tdrop is not less than T_TDROP, the status of the pilot is changed to a "remaining" pilot, t_tdrop is incremented by 2 seconds at step 370, and the channel updating algorithm proceeds to step 344.

Referring again to FIG. 5A, when the channel updating algorithm determines at step 340 that the pilot which is assigned to the channel being evaluated is not a "candidate," the algorithm determines at step 342 whether the pilot for the channel being evaluated is a "remaining" pilot.

If so, the new Ec/Io value for the "candidate" pilot is compared to T_ADD_ACT at step 374 (FIG. 5C), and if the Ec/Io value is greater than T_ADD_ACT the status of the pilot is changed to "active" at step 376, and the channel updating algorithm proceeds to step 344. If the comparison of step 374 indicates that the new Ec/Io value is not greater than T_ADD_ACT, Ec/Io is compared to T_ADD_CAN at step 378. If Ec/Io is greater than T_ADD_CAN, the status of the assigned pilot is changed to a "candidate" at step 380, and the channel updating algorithm proceeds to step 344. If Ec/Io is not greater than T_ADD_CAN, the channel updating algorithm determines at step 382 whether any Ec/Io values in the new data set are greater than the Ec/Io value of the assigned pilot. If so, a new pilot having a larger Ec/Io value is assigned to the channel being evaluated at step 384, and the channel updating algorithm proceeds to step 344. If there are no larger Ec/Io values, the status of the channel being evaluated is maintained at step 385, and the channel updating algorithm proceeds to step 344.

Figure 5D:
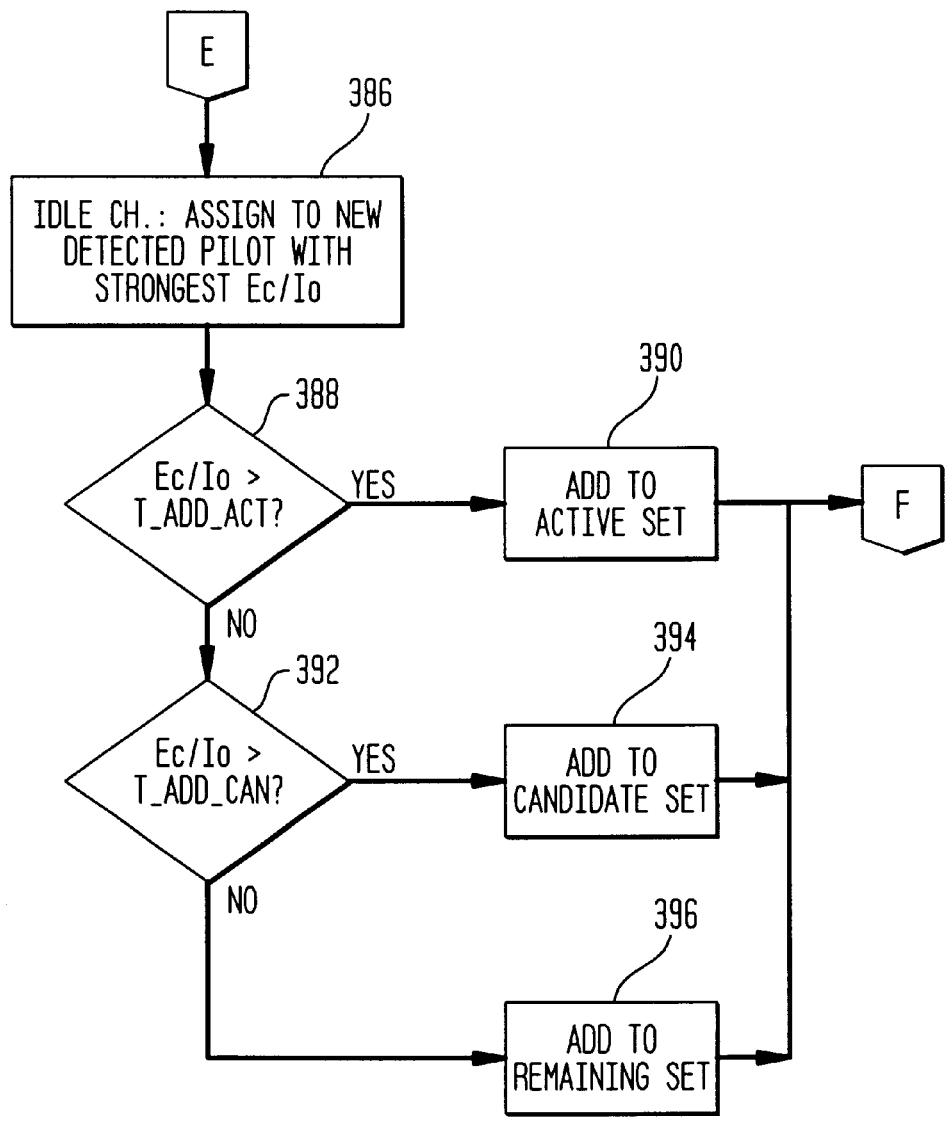

Referring again to FIG. 5A, when the channel updating algorithm determines at step 342 that the pilot for the channel being evaluated is not in the "remaining" set, this indicates that the channel is idle, and the channel updating algorithm proceeds to step 386 (FIG. 5D). At step 386, a new detected pilot with the highest ranked Ec/Io value is assigned to the idle channel. The channel updating algorithm then proceeds to step 388, where the Ec/Io value for the new pilot is compared to T_ADD_ACT. If Ec/Io is greater than T_ADD_ACT, the new detected pilot is designated as "active" at step 390, and the channel updating algorithm proceeds to step 344. When Ec/Io is not greater than T_ADD_ACT, Ec/Io is compared to T_ADD_CAN at step 392. If Ec/Io is greater than T_ADD_CAN, the pilot is designated as a "candidate" pilot at step 394, and if not, the new pilot is designated as a "candidate" pilot at step 396. The channel updating algorithm then proceeds to step 344. At step 344, the channel updating algorithm determines whether all six channels have been evaluated, and if not, returns to step 332 to evaluate and update the next channel in the same manner discussed above.

Figure 5E:
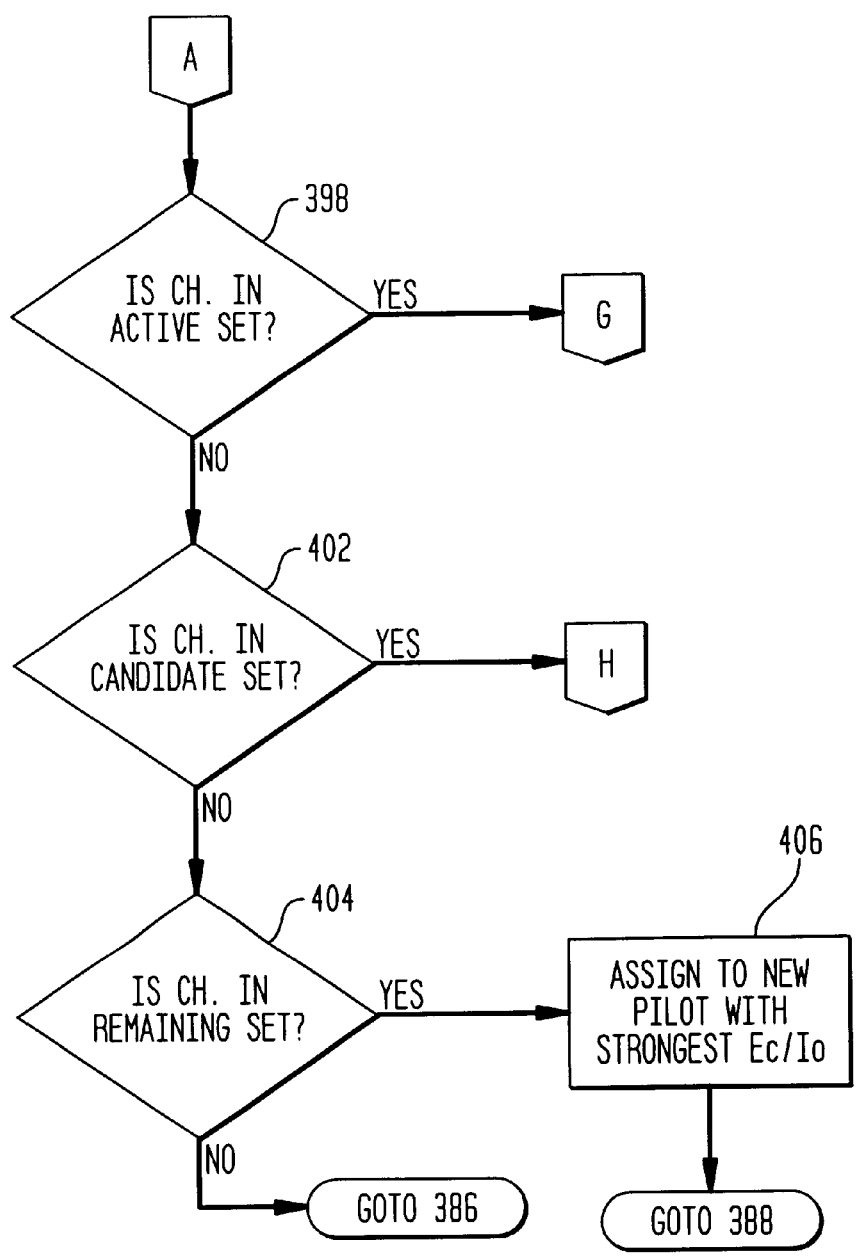
Figure 5F:
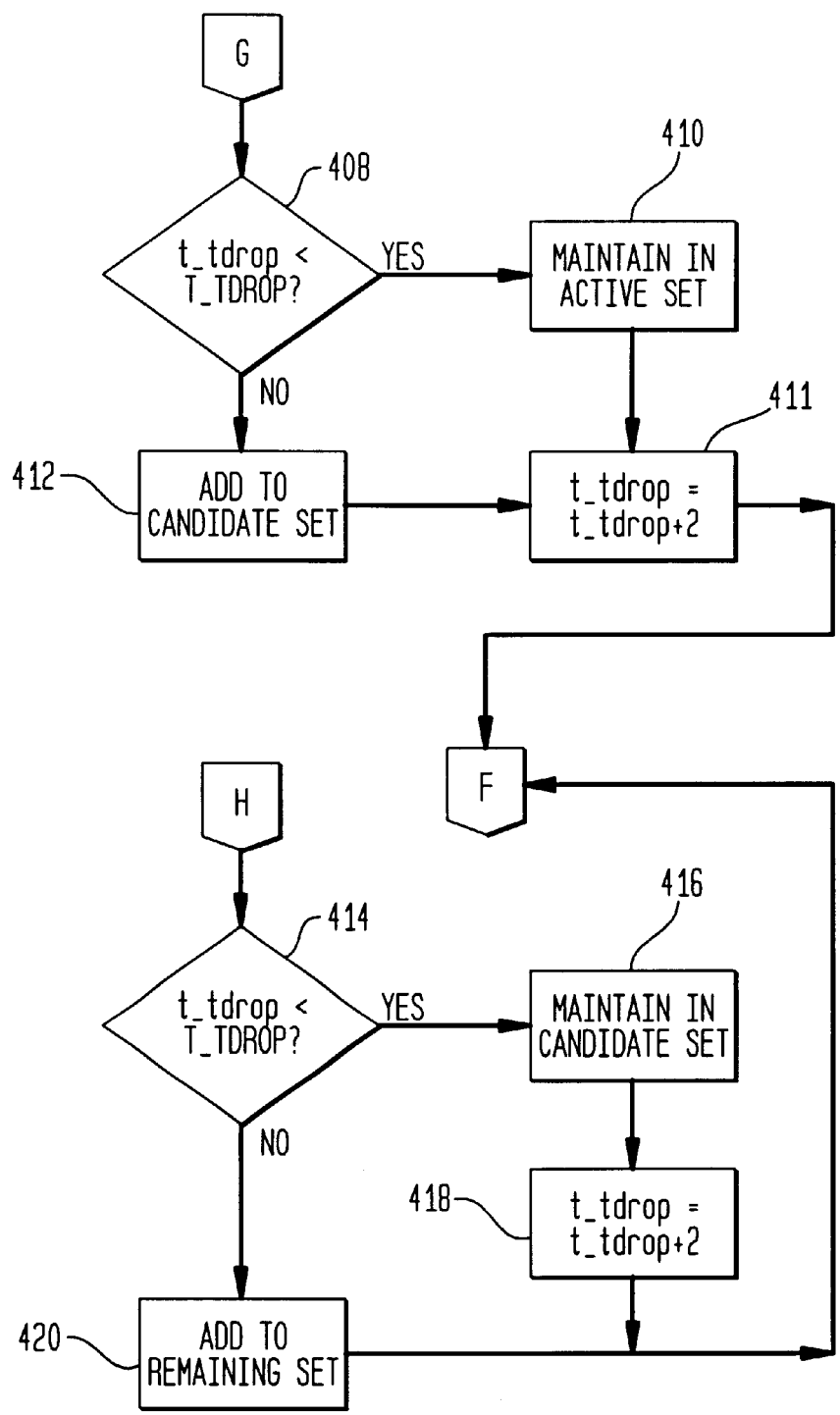

Referring again to FIG. 5A, when step 334 indicates that the new set of Ec/Io values does not contain a value for the assigned pilot of the channel being evaluated, the channel updating algorithm determines whether the pilot for the channel being evaluated is "active" at step 398 (FIG. 5E). If so, t_tdrop is compared to T_TDROP at step 408 (FIG. 5F). When t_tdrop is less than T_TDROP, the pilot is maintained as "active" at step 410, t_tdrop is incremented by 2 seconds at step 411, and the channel updating algorithm proceeds to step 344.

If the comparison of step 408 indicates that t_tdrop is not less than T_TDROP, the status of the assigned pilot is changed to a "candidate" at step 412, t_tdrop is incremented by 2 seconds at step 411, and the channel updating algorithm proceeds to step 344.

Referring again to FIG. 5E, when step 398 indicates that the pilot assigned to the channel being evaluated is not "active," the channel updating algorithm determines at step 402 whether the pilot is a "candidate." If so, t_tdrop is compared to T_TDROP at step 414 (FIG. 5F). If t_tdrop is less than T_TDROP, the pilot is maintained as a "candidate" at step 416, t_tdrop is incremented by 2 seconds at step 418, and the channel updating algorithm proceeds to step 344. When step 414 indicates that t_tdrop is not less than T_TDROP, the pilot for the channel being evaluated is designated as a "remaining" pilot at step 420, and the channel updating algorithm proceeds to step 344.

Referring again to FIG. 5E, when step 402 indicates that the pilot for the channel being evaluated is not a "candidate," the channel updating algorithm determines at step 404 whether the pilot is a "remaining" pilot. If so, the channel is assigned to a pilot from the new set of data with the strongest remaining Ec/Io value at step 406, and the channel updating algorithm proceeds to step 388 (FIG. 5D). When the channel updating algorithm determines at step 404 that the pilot for the channel being evaluated is not a "remaining" pilot, and thus the channel is idle, the algorithm proceeds to step 386 (FIG. 5D) to assign a new detected pilot to the previously idle channel.

As mentioned above, the computer-implemented algorithm for channel updating illustrated by the flowcharts of FIGS. 5A–5F is repeated at time intervals, e.g., every 2 seconds. Channels are updated when matching pilots are found in the new data set, and idle channels are assigned to new detected pilots with relatively strong Ec/Io values. Furthermore, the channels assigned to "remaining" pilots are assigned to pilots in the new data set having greater Ec/Io values. Channels assigned to "active" or "candidate" pilots are maintained for a time T_TDROP.

As result of the channel assignment/updating operation performed by the channel assignment/update unit 154, the field data processor 150 determines which pilots in the field test data are most important at each time instant, and assigns the pilot signals to the forward channels of the TCT 120. The attenuator control unit 159 then calculates the variable attenuator control values for each channel of the TCT for each time instant based on the assigned pilot.

The forward channels of the TCT 120 create variable attenuation between the cell sectors 110–110F and the mobile 160. The forward channel PIN diode attenuators 122A ... 122F create the variable attenuation in accordance with attenuator control values calculated by the attenuator control unit 159. The attenuator control unit 159 calculates these forward channel attenuator control values as follows.

As discussed above, the field test data contains Ec/Io values for each detected pilot, as well as total received pilot power, $P_t^{pilot}$, at frequent-time intervals. Initially, a mobile received power classification equation is given as:

$$P_t = \sum_{n=1}^{N_t} (P_n^{pilot} + P_n^{sync} + P_n^{page}) + P_{traf} + P_{infer} + P_{noise} \quad (1)$$

where:

$P_t$=mobile total received power at time t;

$N_t$=the total number of pilots detected at the mobile at time t;

$P_n^{pilot}$=mobile received pilot power from the nth network cell sector at time t;

$P_n^{Sync}$=mobile received sync power from the nth network cell sector at time t;

$P_n^{page}$=mobile received page power from the nth network cell sector at time t;

$P_{traf}$=mobile received traffic channel power of the serving call;

$P_{infer}$=mobile received interference; and $P_{noise}$=received power due to thermal noise.

The attenuator control unit 159 determines the mobile received pilot power at time t for each assigned pilot by solving:

$$P_n^{pilot} = \left(\frac{E_c}{I_O}\right)_n * P_t^{pilot} \quad (2)$$

The total attenuation which should be recreated along the corresponding forward channel is represented as:

$$\text{Atten.}_{fchannel} = 20 * \log_{10}(P_n^{pilot}/P_{cs}^{pilot}) dB, \quad (3)$$

where $\text{Atten.}_{fchannel}$ represents the total attenuation along the forward channel, and $P_{cs}^{pilot}$ represents the transmit pilot power used by the cell sectors 110–110F. The network cell sectors 110–110F transmit at certain pilot signal power levels, such as +8 dBm. Therefore, $P_{cs}^{pilot}$ is known.

The total channel attenuation for the forward channel, $\text{Atten.}_{fchannel}$, includes a fixed component due to the forward channel fixed attenuator 121A ... 121F (plus cable loss), and a variable component due to the forward channel PIN diode attenuator 122A ... 122F. Therefore, the forward channel attenuator control value, $\text{Atten.}_{fvariable}$, is calculated by solving:

$$\text{Atten.}_{fvariable} = \text{Atten.}_{fchannel} - \text{Atten.}_{fixed} \quad (4)$$

where $\text{Atten.}_{fixed}$ is the attenuation of the forward channel fixed attenuator 121A ... 121F plus cable loss along the forward channel. $\text{Atten.}_{fixed}$ for each forward channel is set during a preliminary set up operation (described below) to balance the fixed attenuation along each channel of the TCT 120. $\text{Atten.}_{fixed}$ will generally be between –50 dB and –60 dB.

The attenuator control unit 159 calculates $\text{Atten.}_{fvariable}$ for each assigned/updated channel to generate the time-varying forward channel attenuator control values which are output to the voltage generator 170. When a forward channel is idle (i.e., there are less than six pilots at time t), the attenuator control unit 159 sets $\text{Atten.}_{fvariable}$ at the highest possible variable attenuation level (e.g., –64 dB).

For the reverse channel PIN diode attenuators 132A ... 132L of the TCT 120, the attenuator control unit 159 uses the attenuator control values from the forward channels 1–6 to create the same attenuation levels along the forward and reverse channels. In other words, the channel 7 and 8 PIN diode attenuators 132A, 132B each use the same attenuation control value as the channel 1 PIN diode attenuator 122A; the channel 9 and 10 PIN diode attenuators 132C, 132D each use the same attenuation control value as the channel 2 PIN diode attenuator 122B; the channel 11 and 12 PIN diode attenuators 132E, 132F each use the same attenuation control value as the channel 3 PIN diode attenuator 122C; the channel 13 and 14 PIN diode attenuators 132G, 132H each use the same attenuation control value as the channel 14 PIN diode attenuator 122D; the channel 15 and 16 PIN diode attenuators 132I, 132J each use the same attenuator control value as the channel 5 PIN diode attenuator 122E; and the channel 17 and 18 PIN diode attenuators 132K, 132L each use the same attenuation control value as the channel 6 PIN diode attenuator 122F. Although the same attenuator control values may be used for the reverse channel PIN diode attenuators 132A ... 132L in a manner described above, the attenuator values for the reverse channels 7–18 may also be varied to recreate different RF loss, such as different fading effects, along the reverse channels.

To determine the attenuator control values for the interference channel PIN diode attenuators 142A and 142B, the total received residual power and noise at time t is first calculated. Specifically, the residual power and interference $P_n$ is calculated by solving the equation:

$$P_n = P_t - \sum_{n \in s}(P_n^{pilot} + P_n^{sync} + P_n^{page}) - P_{traf} - P_{noise} \quad (5)$$

(5)

To solve equation (5), $P_n^{pilot}$ is calculated in accordance with equation (2) above. Furthermore, $P_n^{sync}$ and $P_n^{page}$ are calculated by solving:

$$P_n^{sync} + P_n^{page} = \left[\frac{(\text{gain} - \text{sync})^2 + (\text{gain} - \text{page})^2}{(\text{gain} - \text{pilot})^2}\right] * P_n^{pilot} \quad (6)$$

(6)

where gain-sync, gain-page, and gain-pilot are the network cell sector gain levels used to transmit sync, page, and pilot signals. These gain levels used by the network cell sectors may be retrieved from the network cell sectors, or it may be assumed that the network cell sectors operate in accordance with recommended page, sync, and pilot gain levels. $P_{noise}$ is assumed to be 0, and the serving call traffic channel power, $P_{traf}$ is determined by calculating:

$$P_{traf} = \sum_{n \in s} \left( \frac{(\text{gain} - traf)^2}{(\text{gain} - \text{pilot})^2} * P_n^{pilot} \right) \quad (7)$$

(7)

In equation (7), S represents the assigned set of pilots at time t. RF trace files are collected at network cell sites, and report the transmit digital gain, gain-traf, of the serving call. Thus, attenuator control unit 159 uses RF trace file data to calculate $P_{traf}$.

After passing through the forward interference channel 19 of the TCT 120, the noise signal generated by first AWGN generator 180 results in a residual power and interference signal $P_n$. Therefore, the total attenuation created by interference channel 19 is calculated in accordance with the equation:

$$\text{Atten.}_{channel\text{-}19} = 20 * \log_{10}(P_n/P_{AWGN}) dB, \quad (8)$$

where $\text{Atten.}_{channel\text{-}19}$ represents the total attenuation along the interference channel 19, and $P_{AWGN}$ represents the noise signal power generated by the first AWGN generator 180 (e.g., −4 dBm). The total attenuation resulting along interference channel 19, $\text{Atten.}_{channel\text{-}19}$, includes a fixed component, due to the fixed attenuator 141A (plus cable loss), and a variable component, due to the PIN diode attenuator 142A. Therefore, the forward interference attenuation control value, $\text{Atten.}_{variable\text{-}19}$ is calculated by solving:

$$\text{Atten.}_{variable\text{-}19} = \text{Atten.}_{channel\text{-}19} - \text{Atten.}_{fixed\text{-}19} \quad (9)$$

where $\text{Atten.}_{fixed\text{-}19}$ is the attenuation created by the channel 19 fixed attenuator 141A (plus cable loss).

The reverse interference channel 20 creates the same total attenuation as the forward interference channel 19. Therefore, the attenuation control value for the PIN diode attenuator 142B, $\text{Atten.}_{variable\text{-}20}$, is calculated by solving:

$$\text{Atten.}_{variable\text{-}20} = \text{Atten.}_{channel\text{-}19} - \text{Atten.}_{fixed\text{-}20} \quad (10)$$

where $\text{Atten.}_{fixed\text{-}20}$ is the attenuation created by the fixed attenuator 141B (plus cable loss).

In accordance with the above calculations, the field data processor 150 generates time-varying attenuator control values for each channel of the TCT 120. These attenuator control values are output to the voltage generator 170 for conversion to control voltage levels which are received by the PIN diode attenuators of the TCT 120.

While the configuration of the field data processor 150 illustrated in FIG. 3 shows separate functional units for performing channel assignment/updating and attenuator control, this configuration is shown for ease of explanation, and it should be realized that a single computer processor could be used to perform these functions.

Calibration

Certain considerations are taken into account when the RF recreating apparatus 100 is implemented in the lab to ensure that the desired levels of attenuation result along each channel of the TCT 120. Specifically, because cables are used in the lab to connect each of the cell sectors 110–110F to the TCT 120, and to connect the TCT 120 to the mobile 160, cable loss generally occurs. Furthermore, because different cable lengths in the channels of the TCT 120 will create slightly different levels of cable loss in each channel, the forward, reverse, and interference channels of the TCT 120 are balanced during an initial start-up operation to ensure that each channel exhibits the same fixed attenuation when the PIN diode attenuators are idle (i.e., when the voltage generator 170 outputs attenuator control voltages of 0.0 volts to each PIN diode attenuator of the TCT 120). Specifically, the aggregate cable loss is measured along each channel, and the fixed attenuators 121A . . . 121F, 131A . . . 131L, 141A, and 142B are set to balance the fixed attenuation along channels 1–20 when 0.0 volts are input to the PIN diode attenuators 122A . . . 122F, 132A . . . 132F, 142A, and 142B of the TCT 120.

Furthermore, the attenuation characteristics of the PIN diode attenuators used in the TCT 120 may differ slightly. Therefore, the field data processor 150 calculates calibration coefficients for the PIN diode attenuators 122A . . . 122F, 132A . . . 132L, 142A, and 142B so that the attenuator control values output by the field data processor 150 result in the desired attenuation in the corresponding channel of the TCT 120.

Figure 6:
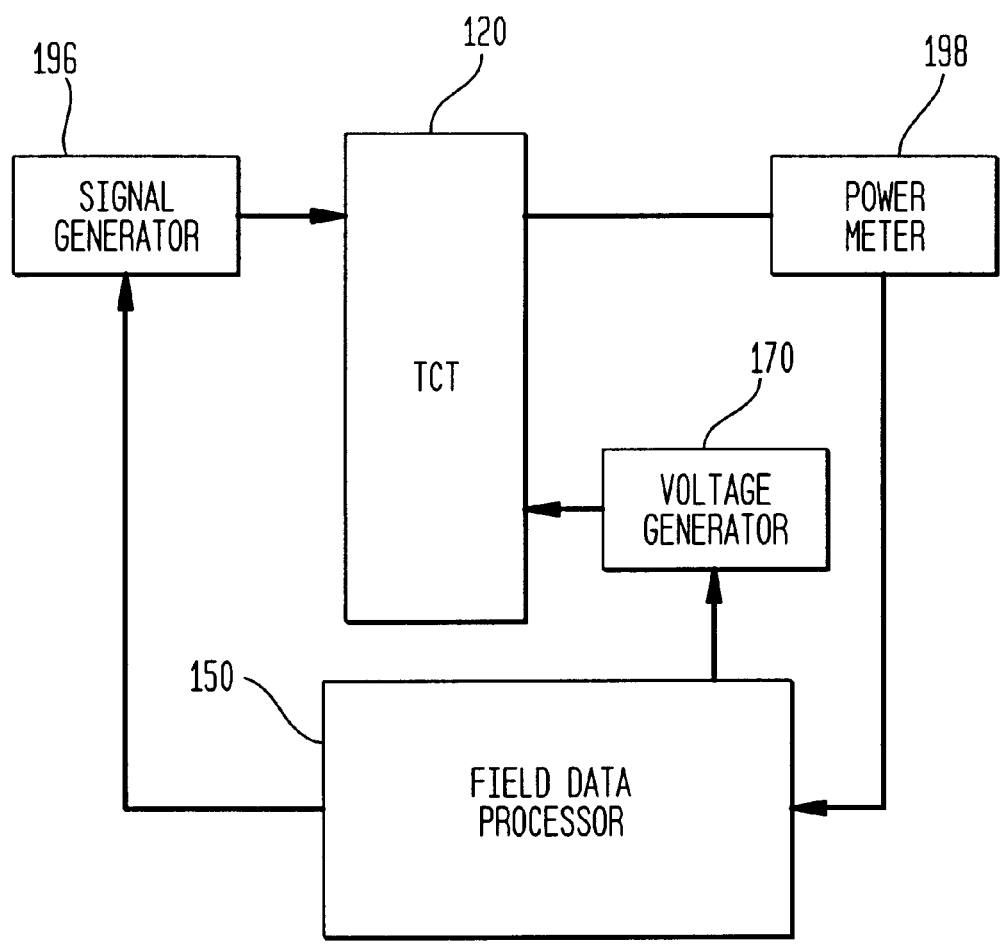
FIG. 6 is a block diagram of an arrangement for calibrating the forward/reverse channel attenuator.

FIG. 6 illustrates a suitable configuration which enables the field data processor 150 to calculate such calibration coefficients. Specifically, a signal generator 196 is connected to the TCT 120 to input a predetermined signal to each channel of the TCT 120. A power meter 198 is connected to the output of the TCT 120 to measure power loss when the field data processor 150 outputs a given attenuation control value to the voltage generator 170. The field data processor 150 calculates calibration coefficients to minimize the difference between the expected attenuation (i.e., the attenuator control value output by the field data processor 150), and the attenuation measured by the power meter 198. Specifically, the field data processor 150 calculates correction coefficients, multiplier and scalar, to minimize the error function:

$$|y\text{-multiplier}*x\text{-scalar}|^2 \quad (11)$$

where y is the attenuation control value output by the field data processor 150 (i.e., expected attenuation), and x is the actual attenuation measured by the power meter 198 when the field data processor 150 outputs y as the attenuator control value. To achieve the desired attenuation y, the field data processor 159 adjusts the attenuation control values by calculating:

$$y' = (\text{multiplier}*y + \text{scalar}) \quad (12)$$

where y' is the calibrated attenuation control which the field data processor outputs to the voltage generator 170 during subsequent operation.

In accordance with the present invention, the RF environment recreating apparatus 100 recreates the interference environment of a cellular network region using a computer controlled, multi-channel attenuation tool. To achieve this result, the field data processor 150 converts field test data to attenuator control values for each channel of the TCT 120. Accordingly, the mobile 160 in the lab sees the same carrier and interference levels that were observed in the field environment, and repeated field testing is not needed to test network equipment, parameters, and algorithms before being deployed in a cellular network. For example, handoff procedures, traffic channel power control, and voice signal quality may be tested and optimized using the RF recreating apparatus 100 described above under constant RF conditions extracted from a field test data file.

What is claimed is:

1. An apparatus for generating a communication receive signal comprising:

an attenuator receiving at least one first communication signal and variably attenuating said at least one first communication signal using field test data to generate said communication receive signal, the attenuator receiving a noise signal representing residual power and noise in said field test data.

2. The apparatus of claim 1, wherein said communication receive signal is a mobile receive signal.

3. The apparatus of claim 1, wherein said communication receive signal is a base station receive signal.

4. The apparatus of claim 1, wherein
said attenuator receives a plurality of first communication signals; and
said attenuator includes a plurality of forward attenuation channels respectively corresponding to said plurality of first communication signals.

5. The apparatus of claim 1, wherein said attenuator variably attenuates said at least one first communication signal in accordance with attenuator control values extracted from said field test data.

6. The apparatus of claim 1, wherein said attenuator includes a plurality of reverse attenuation channels for attenuating said at least one first communication signal.

7. The apparatus of claim 1, wherein said field test data includes data collected by a mobile diagnostic device in a cellular communication network.

8. The apparatus of claim 7, wherein said cellular communication network is a code division multiple access (CDMA) network.

9. The apparatus of claim 8, wherein
said field test data includes time-varying values representing pilot signals received from cell sectors in said CDMA network; and
said at least one first communication signal includes a pilot signal component.

10. The apparatus of claim 9, wherein said attenuator includes a plurality of forward attenuation channels which are assigned to significant pilot signals extracted from said field test data.

11. The apparatus of claim 1, wherein said attenuator includes a PIN diode attenuator for variably attenuating said at least one first communication signal.

12. The apparatus of claim 11, wherein said attenuator further includes a fixed attenuator.

13. The apparatus of claim 1, wherein said attenuator includes an interference channel for variably attenuating said noise signal.

14. The apparatus of claim 13, wherein said attenuator includes a forward interference channel and a reverse interference channel.

15. A method for generating a communication receive signal comprising:
receiving at least one first communication signal; and
variably attenuating said at least one first communication signal using field test data to generate said communication receive signal, the attenuating step receiving a noise signal representing residual power and noise in said field test data.

16. The method of claim 15, wherein said communication receive signal is a mobile receive signal.

17. The method of claim 15, wherein said communication receive signal is a base station receive signal.

18. The method of claim 15, wherein
said receiving step receives a plurality of first communication signals, and
said attenuating step attenuates each of said plurality of first communication signals.

19. The method of claim 15, where said receiving step receives said at least one first communication signal from a cell sector.

20. The method of claim 15, wherein said attenuating step attenuates said at least one first communication signal in accordance with attenuation control values extracted from said field test data.

21. The method of claim 15, wherein said field test data includes data collected by a mobile diagnostic device in a cellular communication network.

22. The method of claim 21, wherein said cellular communication network is a code division multiple access (CDMA) network.

23. The method of claim 22, wherein
said field test data includes time-varying values representing pilot signal power received from cell sectors in said CDMA network, and
said at least one first communication signal includes a pilot signal component.

24. An apparatus for converting field test data to control values for a plurality of attenuation channels, comprising:
a field data storage unit for storing previously gathered field test data;
a channel assignment unit for extracting significant communication signal components from said field test data and assigning said significant communication signal components to said plurality of attenuation channels; and
an attenuator control unit for calculating time-varying attenuation control values for said plurality of attenuation channels in accordance with the significant communication signal components assigned by said channel assignment unit.

25. The apparatus of claim 24, wherein said attenuator control unit calculates time-varying attenuation control values for a plurality of forward attenuation channels and a plurality of reverse attenuation channels.

26. The apparatus of claim 25, wherein said attenuator control unit calculates time-varying attenuation control values for an interference channel in accordance with a residual power value extracted from said field test data.

27. The apparatus of claim 24, wherein said field test data includes data collected by a mobile diagnostic device in a cellular communication network.

28. The apparatus of claim 27, wherein said cellular communication network is a code division multiple access (CDMA) network.

29. The apparatus of claim 28, wherein
said field test data includes time-varying values representing pilot signals received from cell sectors in said CDMA network, and
said significant communication signal components extracted by said channel assignment unit are pilot signals.

30. A method of converting field test data to control values for a plurality of attenuation channels, comprising:
storing previously gathered field test data;
extracting significant communication signal components from said field test data and assigning said significant communication signal components to said plurality of attenuation channels; and
calculating time-varying attenuation control values for said plurality of attenuation channels in accordance with the assigned significant communication signal components.

31. The method of claim 30, wherein said calculating step calculates time-varying attenuation control values for a plurality of forward attenuation channels and a plurality of reverse attenuation channels.

32. The method of claim 31, wherein said calculating step calculates time-varying attenuation control values for an interference channel in accordance with a residual power value extracted from said field test data.

33. The method of claim 32, wherein said field test data includes data collected by a mobile diagnostic device in a cellular communication network.

34. The method of claim 33, wherein said cellular communication network is a code division multiple access (CDMA) network.

35. The method of claim 34, wherein
said field test data includes time-varying values representing pilot signals received from cell sectors in said CDMA network, and
said significant communication signal components extracted by extracting step are pilot signals.

36. An apparatus comprising:
a signal path receiving a first communication signal and varying said first communication signal; and
control means for adjusting said signal path using field test data, the control means receives a noise signal representing residual power and noise in said field test data.

* * * * *